United States Patent
Ishii et al.

(10) Patent No.: US 8,332,548 B2
(45) Date of Patent: Dec. 11, 2012

(54) MONITORING DEVICE, SEMICONDUCTOR INTEGRATED CIRCUIT, AND MONITORING METHOD

(75) Inventors: Takanori Ishii, Kawasaki (JP); Nina Arataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 11/905,305

(22) Filed: Sep. 28, 2007

(65) Prior Publication Data

US 2008/0147902 A1 Jun. 19, 2008

(30) Foreign Application Priority Data

Dec. 13, 2006 (JP) ................................ 2006-335603

(51) Int. Cl.
*G06F 3/00* (2006.01)
(52) U.S. Cl. ........................................... 710/19; 710/33
(58) Field of Classification Search .................... 710/22, 710/19, 33, 18
See application file for complete search history.

(56) References Cited

U.S. PATENT DOCUMENTS

| | | | | |
|---|---|---|---|---|
| 7,206,869 B2 * | 4/2007 | Shishizuka et al. | ............. | 710/20 |
| 7,467,238 B2 * | 12/2008 | Hosoya et al. | .................. | 710/22 |
| 2002/0116555 A1 * | 8/2002 | Somers et al. | .................. | 710/26 |
| 2005/0080946 A1 * | 4/2005 | Hosoya | .......................... | 710/33 |
| 2005/0120151 A1 * | 6/2005 | Furukawa et al. | ............. | 710/33 |
| 2006/0047900 A1 * | 3/2006 | Tanaka et al. | .................. | 711/113 |
| 2006/0080502 A1 * | 4/2006 | Sakaki et al. | .................. | 711/112 |
| 2006/0140008 A1 * | 6/2006 | Hirako et al. | ............ | 365/185.22 |
| 2006/0236001 A1 * | 10/2006 | Tanabe | ........................... | 710/22 |
| 2007/0198798 A1 * | 8/2007 | Kanai et al. | .................. | 711/165 |
| 2008/0043732 A1 * | 2/2008 | Desai et al. | .................... | 370/389 |

FOREIGN PATENT DOCUMENTS

| | | |
|---|---|---|
| JP | 3/24657 | 2/1991 |
| JP | H04-43443 | 2/1992 |
| JP | H06-062078 | 3/1994 |
| JP | 6-266648 | 9/1994 |
| JP | 07-044470 | 2/1995 |
| JP | 9-54749 | 2/1997 |
| JP | 11-134261 | 5/1999 |
| JP | 11-232211 | 8/1999 |
| JP | 11-306095 | 11/1999 |
| JP | 2000-003331 | 1/2000 |
| JP | 2000-276369 | 10/2000 |

(Continued)

OTHER PUBLICATIONS

Japanese Office Action issued on Apr. 30, 2009 in corresponding Japanese Patent Application 2006-335603.
Japanese Decision of Patent Grant for corresponding Japanese Patent Application No. 2006-335603. The Japanese Decision of Patent Grant is dated Nov. 4, 2009, and a partial English language translation of the Japanese Decision of Patent Grant is provided.

*Primary Examiner* — Ernest Unelus
(74) *Attorney, Agent, or Firm* — Fujitsu Patent Center (57) ABSTRACT

A transfer-indication storage unit indicates an address and a data length of data to be transferred by a DMA circuit. An expected value table refers to a transfer indication of the transfer-indication storage unit and stores therein expected values of the address and the data length of the data to be transferred. A transfer-monitoring unit retrieves tag data and a data length of data in a bus. Based on the data length and the tag data notified by the transfer-monitoring unit, a table updating unit updates a start address and the data length in the expected value table. A determining unit determines whether the start address, corresponding to the DMA circuit after data transfer, matches with an end address, and further determines whether the data length has become zero.

11 Claims, 6 Drawing Sheets

FOREIGN PATENT DOCUMENTS

| | | |
|---|---|---|
| JP | 2001-060966 | 3/2001 |
| JP | 2003-263399 | 9/2003 |
| JP | 2005-115464 | 4/2005 |
| WO | WO2006/077977 | 7/2006 |

* cited by examiner

| TAG DATA | START ADDRESS | END ADDRESS | DATA LENGTH |
|---|---|---|---|
| DMA#1 | 1000F27 | 100125A | 333 |
| DMA#2 | 1000010 | 1000A18 | A08 |
| ⋮ | | | |

MONITORING DEVICE, SEMICONDUCTOR INTEGRATED CIRCUIT, AND MONITORING METHOD

BACKGROUND OF THE INVENTION

1. Field of the Invention

The present invention relates to a monitoring device, a semiconductor integrated circuit (IC), and a monitoring method which monitor a data transfer that is executed by a transferring circuit according to a transfer indication, specifically to a monitoring device, a semiconductor IC, and a monitoring method which enable to monitor, when a direct memory access (DMA) chip splits and transfers data via a direct memory access, whether a failure has occurred in the DMA chip.

2. Description of the Related Art

Recently, along with an improvement in a processing capacity of a computer, data used by the computer has ever been increasing and a lot of studies related to a storage for storing a large amount of data have been carried out. To be specific, for example, a plurality of hard disk drives (HDD) are combined to construct a disk system, called a redundant array of independent disks (RAID), which realizes high-speed, large capacity, and high reliability.

In the disk system such as the RAID, a disk array device including a plurality of disks which store therein data receives a command from a higher level device such as a host computer and carries out writing (write) or reading (read) of data. During the write or read, data transacted between the host computer and the disks is also cached in a cache memory inside the disk array device, and in subsequent processing, the data is read from the cache memory, thus generally enhancing a processing speed. Further, the host computer is connected to a channel adaptor inside the disk array device and the channel adaptor executes a data transfer between the host computer, the cache memory, and the disks.

The channel adaptor internally includes a direct memory access (hereinafter referred to as "DMA") chip such as a large-scale integration (LSI) which controls the data transfer via the DMA. The DMA chip transfers data according to an indication (descriptor) of data transfer from a central processing unit (CPU). In other words, upon receiving the descriptor, the DMA chip transmits and receives data via a bus to the cache memory and the like, an address of the data and a data length being indicated by the descriptor.

During transmitting and receiving data, for example, the DMA chip sometimes splits and transfers the data, depending on a storage capacity of the bus or a processing status at a data transfer destination. In other words, the DMA chip includes a bus controller which controls the bus. The bus controller splits a batch of data into pieces of data of data length according to the storage capacity of the bus, and temporarily stops the data transfer based on an indication from the data transfer destination.

Figure 8:
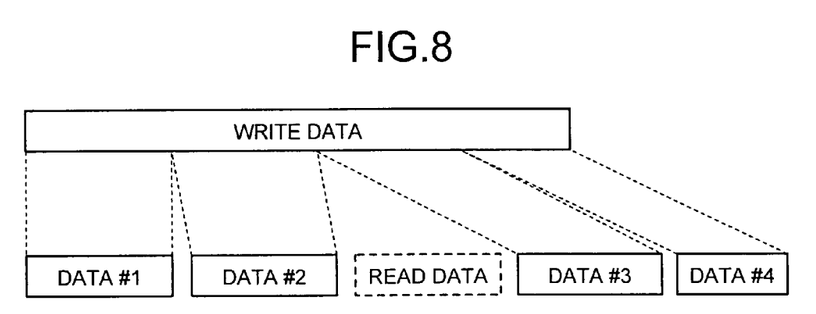
FIG. 8 is a schematic of an example of a write data transfer using a DMA.

To be specific, as shown in FIG. 8, when transferring a packet of write data, the bus controller provided to the DMA chip splits the write data into pieces of data #1 to #4, and transfers the pieces of data to the transfer destination such as the cache memory. Further, other commands are processed during the transfer of each piece of data. As shown in FIG. 8, a transfer of read data is executed during transferring the data #2 and the data #3.

Further, a plurality of DMA circuits are included inside the DMA chip in general. For example, in a technology disclosed in Japanese Patent Application Laid-open No. 2005-115464, an arbiter carries out an adjustment (arbitration) of a transfer sequence of each DMA circuit. Accordingly, when data from one DMA circuit inside the DMA chip is split into pieces of data by the bus controller and transferred, the data transferred from the other DMA circuits is also transferred during the transfer of those pieces of data.

However, in the data transfer using the bus controller mentioned above, even if a portion of one piece of data is not transferred normally due to a failure such as a soft error and a logical disorder in the DMA chip, an error does not occur in a bus protocol and the portion in which the failure has occurred cannot be easily specified. In other words, when the bus controller splits the original data into the pieces of data and transfers the pieces of data, for example, even after occurrence of a failure such as a complete annihilation of the portion of the piece of data, an error does not occur on the bus protocol as long as the other pieces of data are transferred normally. Due to this, the error is detected only when the pieces of data are combined in the transfer destination of data and a cause of the error cannot be easily specified.

Especially, when using an already manufactured product as the bus controller of the DMA chip, because the bus controller is a black box, whether a processing in the bus controller is executed normally cannot be confirmed. Due to this, if an error is detected in the transfer destination of data, whether a failure has occurred in the DMA chip cannot be found out.

SUMMARY OF THE INVENTION

It is an object of the present invention to at least partially solve the problems in the conventional technology.

A monitoring device which monitors a data transfer according to one aspect of the present invention includes a transferring circuit that executes the data transfer according to a transfer indication; a storage unit that stores therein an address and a data length of transfer target data indicated by the transfer indication; a retrieving unit that retrieves a data length of data which is actually transferred by the transferring circuit; an updating unit that updates, based on the data length retrieved by the retrieving unit, the address and the data length stored in the storage unit; and a determining unit that determines, at a time of completion of a transfer of the transfer target data by the transferring circuit, whether the data transfer is completed normally based on one of the address and the data length which are stored in the storage unit.

A semiconductor integrated circuit according to another aspect of the invention includes a transferring circuit that executes a data transfer via a direct memory access according to a transfer indication from a processor; a storage unit that stores therein an address and a data length of transfer target data indicated by the transfer indication; a retrieving unit that retrieves a data length of data which is actually transferred by the transferring circuit; an updating unit that updates, based on the data length retrieved by the retrieving unit, the address and the data length stored in the storage unit; and a determining unit that determines, at a time of completion of a transfer of the transfer target data by the transferring circuit, whether the data transfer is completed normally based on one of the address and the data length which are stored in the storage unit.

A monitoring method of a data transfer according to still another aspect of the invention includes executing the data transfer according to a transfer indication by a transferring circuit; storing an address and a data length of transfer target data indicated by the transfer indication in a storing circuit; retrieving a data length of data which is actually transferred by the transferring circuit; updating the address and the data length stored in the storing circuit based on the data length retrieved in the retrieving; and determining whether the data transfer is completed normally based on one of the address and the data length which are stored in the storing circuit at a time of completion of a transfer of the transfer target data by the transferring circuit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
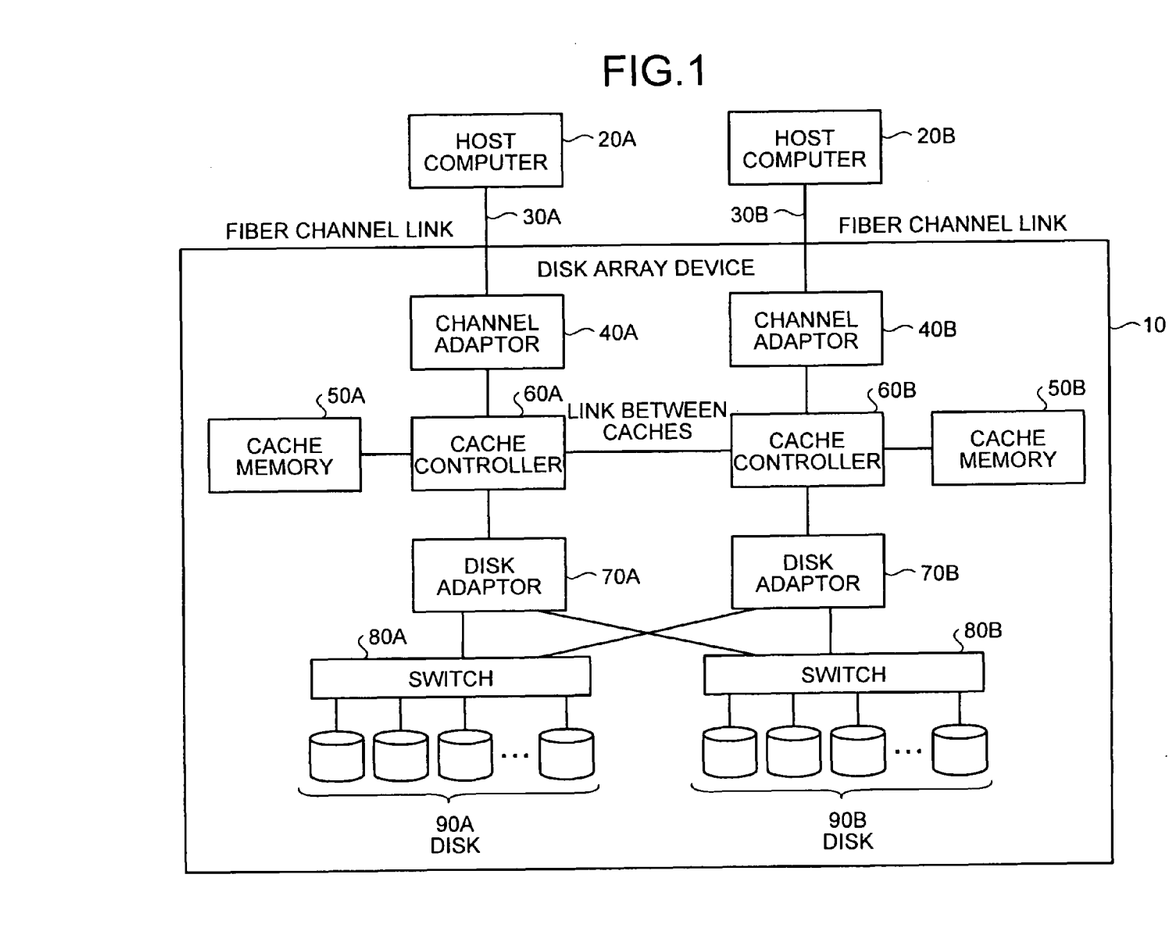
FIG. 1 is a block diagram of a disk array device according to an embodiment of the present invention.

FIG. 1 is a block diagram of a disk array device 10 according to an embodiment of the present invention. The disk array device 10 shown in FIG. 1 is an example of a computer system to which a direct memory access (DMA) is applied. The disk array device 10 is connected to host computers 20A and 20B via fiber channel links 30A and 30B. For securing high reliability, the disk array device 10 has a redundant structure and includes two systems (in the example shown in FIG. 1, the two systems are differentiated by adding A and B to the reference numerals) of each component. Because the components of the two systems have equivalent functions to each other, the components of only one system will be explained below.

The disk array device 10 includes a channel adaptor 40A, a cache memory 50A, a cache controller 60A, a disk adaptor 70A, a switch 80A, and disks 90A.

The channel adaptor 40A has a function as a communication interface that carries out transmitting and receiving of data with the host computer 20A. Further, the channel adaptor 40A has a large-scale integration (LSI) (in other words, a DMA chip) that carries out data transfer by using the DMA. In the present embodiment, a data transfer to the cache memory 50A performed by the channel adaptor 40A via the cache controller 60A will be explained. During the transfer, in the channel adaptor 40A, the LSI transfers the data to the cache controller 60A according to a descriptor from a central processing unit (CPU). A specific structure and an operation of the channel adaptor 40A will be explained in detail later.

The cache memory 50A temporarily stores therein data that is written by the host computer 20A to the disks 90A or data that is read from the disks 90A by the host computer 20A.

The cache controller 60A administers and controls reading and writing of data in the cache memory 50A. The cache controller 60A is connected to a cache controller 60B of the other system via an inter-cache linkage. Thus, data to be written to the cache memories 50A and 50B is shared.

The disk adaptor 70A has a function as a communication interface that carries out transmitting and receiving of data with the disks 90A. In other words, the disk adaptor 70A transmits to the disks 90A, data read from the cache memory 50A and receives from the disks 90A, data to be written to the cache memory 50A.

The switch 80A connects the disks 90A and also switches a connection of the disk adaptor 70A with each disk. The disks 90A, for example, are formed of multiple hard disk drives (HDD). Each disk stores therein transfer target data.

Figure 2:
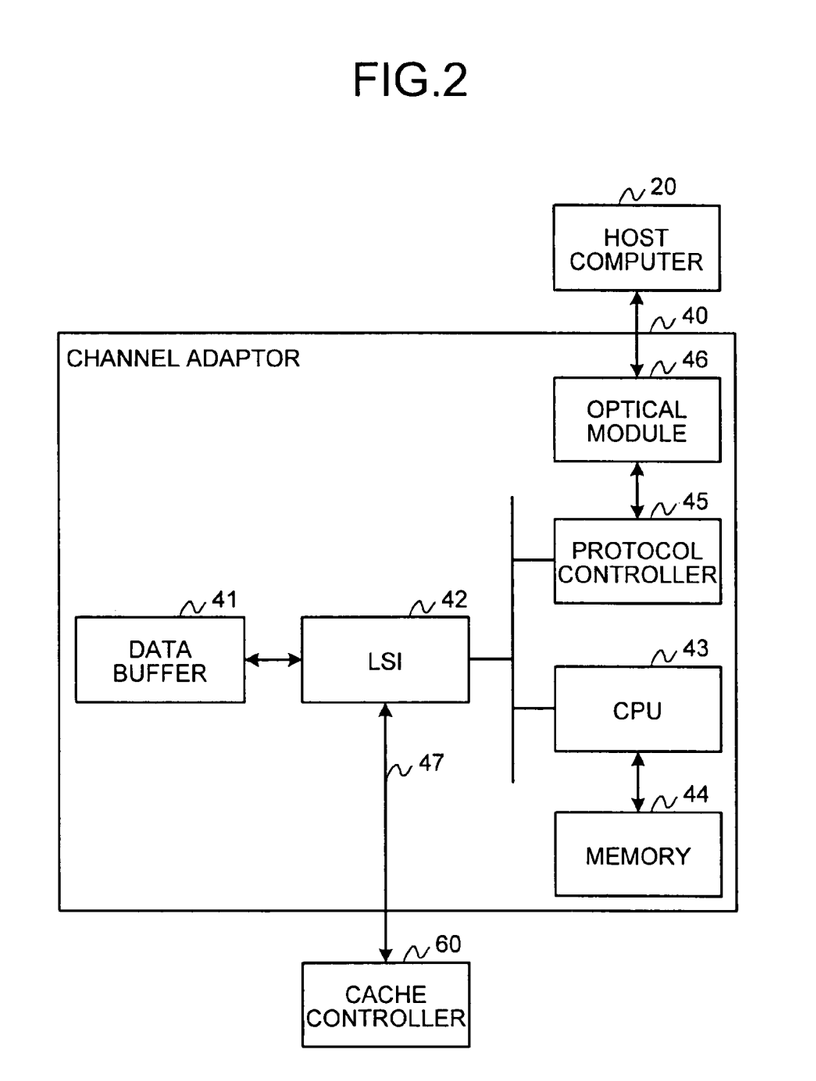
FIG. 2 is a block diagram of an inside of a channel adaptor according to the embodiment.

FIG. 2 is a block diagram of an internal configuration of the channel adaptor 40 according to the embodiment. As shown in FIG. 2, a notation of A and B to the reference numerals shown in FIG. 1 is omitted and the host computers 20A and 20B, for example, are described as the host computer 20. The channel adaptor 40 shown in FIG. 2 includes a data buffer 41, an LSI 42, a CPU 43, a memory 44, a protocol controller 45, an optical module 46, and a bus 47.

The data buffer 41 temporarily stores therein data which is transferred from the host computer 20 and is awaiting a transfer to the cache controller 60. Further, the data buffer 41 also temporarily stores therein data which is transferred from the cache controller 60 and is awaiting a transfer to the host computer 20.

The LSI 42 includes a plurality of DMA circuits. According to the descriptor from the CPU 43, the LSI 42 transfers to the cache memory 50 via the cache controller 60, data stored in the data buffer 41. During the transfer, the LSI 42 splits the data into plural pieces of data according to the storage capacity of the bus 47 and the processing status in the cache controller 60, and transfers the pieces of data. The LSI 42 according to the present embodiment includes a logic analyzer that monitors an address and a data length of each piece of data which is transferred from the bus 47, and determines whether the original data indicated by the descriptor is transferred normally. A substantial structure and an operation of the LSI 42 will be explained in detail later.

The CPU 43 is a processor that carries out an integrated control of the entire channel adaptor 40. The CPU 43 interprets a command from the host computer 20, stores the descriptor in the memory 44, and sequentially transmits to the LSI 42 the descriptor stored in the memory 44.

The memory 44, for example, is formed of a dynamic random access memory (DRAM) and stores therein the descriptor generated by the CPU 43.

The protocol controller 45 controls a protocol of fiber channels (the fiber channel links 30A and 30B shown in FIG. 1) which are used for the connection between the channel adaptor 40 and the host computer 20. The protocol controller 45 outputs to the CPU 43 the data and the commands transferred from the host computer 20.

The optical module 46 is connected to the host computer 20. The optical module 46 converts into electronic signals, optical signals transmitted from the host computer 20 by optical fibers. Further, the optical module 46 converts into optical signals, electronic signals output from the protocol controller 45, and transfers the optical signals to the host computer 20.

The bus 47 is a bus which confirms to standards such as peripheral component interconnect (PCI), PCI-X, and PCI-Express. The bus 47 transmits to the cache controller 60, the pieces of data output from the LSI 42. Further, the bus 47 includes a signal line that allows passage of various control signals. Along with the transfer of the pieces of data, the bus 47 carries out a transaction of the control signals between the channel adaptor 40 and the cache controller 60.

Figure 3:
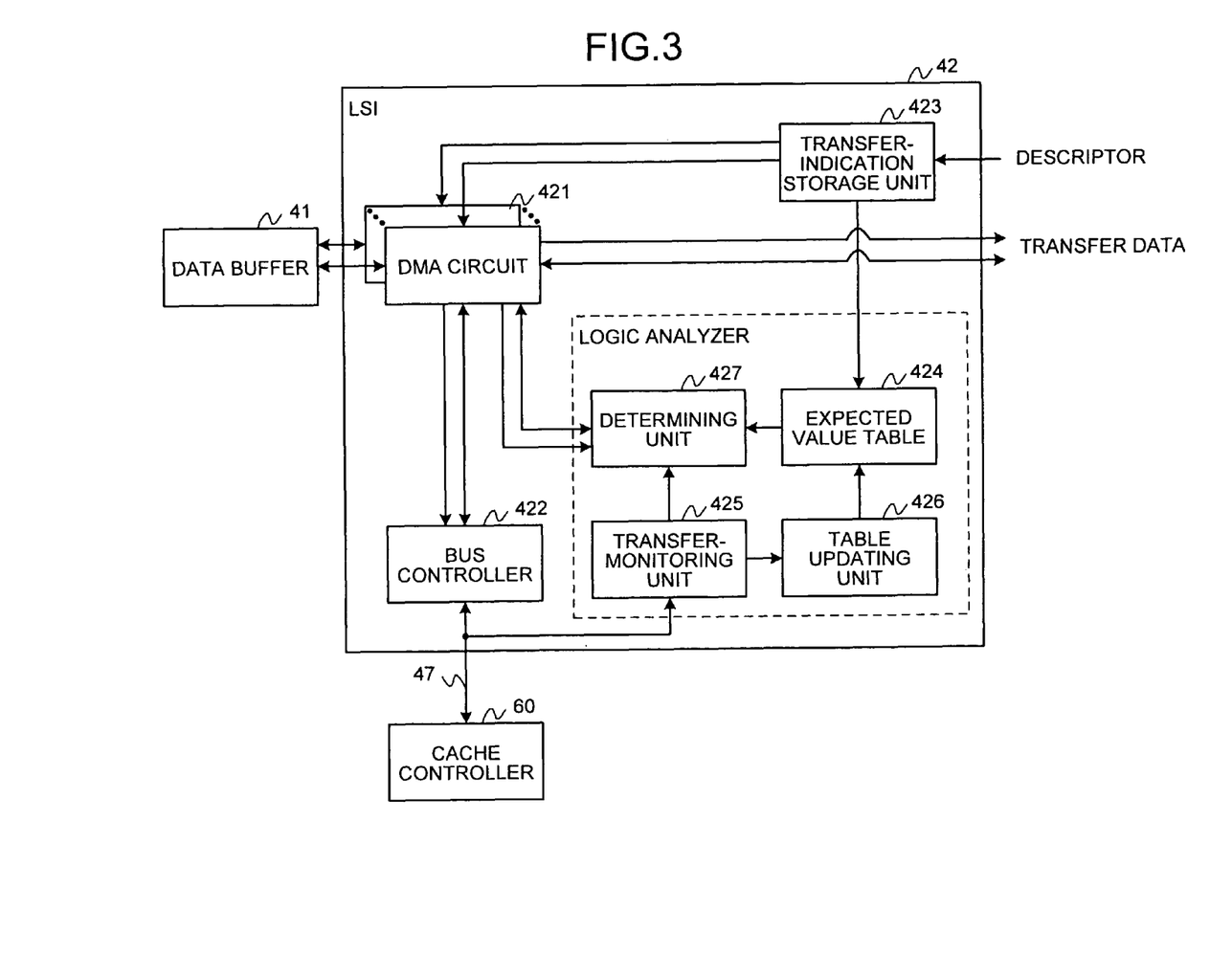
FIG. 3 is a block diagram of a substantial part of an LSI according to the embodiment.

FIG. 3 is a block diagram of a substantial structure of the LSI 42 according to the present embodiment. As shown in FIG. 3, the LSI 42 includes a plurality of DMA circuits 421, a bus controller 422, a transfer-indication storage unit 423, an expected value table 424, a transfer-monitoring unit 425, a table updating unit 426, and a determining unit 427. The expected value table 424, the transfer-monitoring unit 425, the table updating unit 426, and the determining unit 427 form the logic analyzer according to the present embodiment.

Each of the DMA circuits 421 reads from the data buffer 41, data of the address and the data length indicated from the transfer-indication storage unit 423, transfers the read data to the cache controller 60 via the bus controller 422, and outputs the read data as the transfer data to the host computer 20. To be specific, during a time interval when the bus 47 is allotted by the bus controller 422, each DMA circuit 421 adds tag data to the data read from the data buffer 41 and transmits the data. The tag data includes data which uniquely identifies the DMA circuit 421, and a transfer start bit which indicates whether the data is at the head portion of the transfer data.

Further, if the DMA circuits 421 cannot transmit the entire transfer data within the time interval which is allotted to the bus 47 by the bus controller 422, the DMA circuits 421 once again add the tag data to the remaining data during the next time interval allotted to the bus 47 and transmit the remaining data. In other words, the DMA circuits 421 split the data into pieces of data, and after adding the tag data to each piece of data transmit the pieces of data to the bus controller 422. Further, after the transfer of data to the cache controller 60 is completed, each of the DMA circuits 421 inquires of the determining unit 427 whether the data transfer is completed normally.

Figure 4:
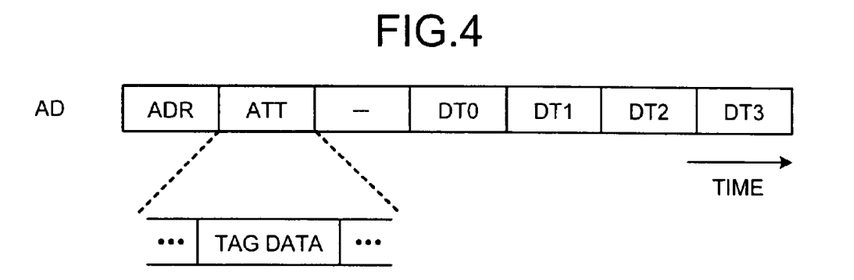
FIG. 4 is a schematic of a data transfer in a bus according to the embodiment.

The bus controller 422 controls allotment of the bus 47 to the DMA circuits 421 via arbitration, and uses one of the signal lines provided to the bus 47 to perform a burst transfer of the pieces of data transmitted from the DMA circuits 421. To be specific, as shown in FIG. 4, for example, the bus controller 422 uses a signal of a signal name "address data (AD)" by time-sharing and transmits the pieces of data from the DMA circuits 421 in data phases (DT0 to DT3 in the example shown in FIG. 4) which continue after an address phase (ADR in the example shown in FIG. 4) and an attribute phase (ATT in the example shown in FIG. 4). As shown in FIG. 4, the tag data mentioned above is included in the attribute phase. An interval between the attribute phase and the data phases is a phase when a reply is received from the cache controller 60 as the transfer destination.

Based on the descriptor transmitted from the CPU 43, the transfer-indication storage unit 423 generates a transfer indication constituted by the address and the data length of the data transferred by the DMA circuits 421, stores therein the generated transfer indication, and indicates the address and the data length of the transfer data to the DMA circuit 421 that can execute the transfer of data.

Figure 5:
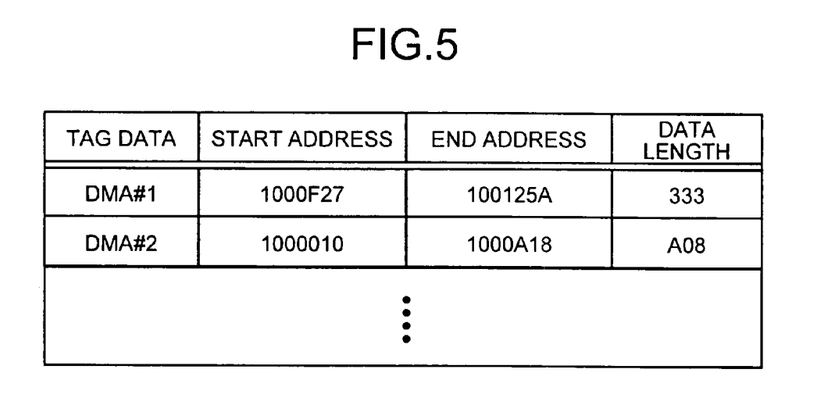
FIG. 5 is a schematic of an example of an expected value table according to the embodiment.

The expected value table 424 refers to the transfer indication stored in the transfer-indication storage unit 423 and stores in a table format, expected values of the address and the data length of the data transferred by the DMA circuits 421. To be specific, for example as shown in FIG. 5, the expected value table 424 associates and stores, with a start address, an end address, and the data length of the data to be transferred, the tag data ("DMA #1" and the like in the example shown in FIG. 5) that uniquely identifies each DMA circuit 421. However, upon receiving a notification from the table updating unit 426 that a transfer of new data is started by any one of the DMA circuits 421, the expected value table 424 reads from the transfer-indication storage unit 423, the address and the data length which are indicated to the corresponding DMA circuit 421, and updates the expected values of the start address, the end address, and the data length.

The transfer-monitoring unit 425 monitors a transfer status of the pieces of data in the bus 47 and retrieves data necessary for updating the expected value table 424 and for determining by the determining unit 427. To be specific, the transfer-monitoring unit 425 retrieves the address of the data transferred in the bus 47, notifies the retrieved address to the determining unit 427, retrieves the data length, and notifies the retrieved data length to the table updating unit 426. Further, the transfer-monitoring unit 425 retrieves the tag data transferred in the bus 47, and notifies the tag data along with the address and the data length to the determining unit 427 or the table updating unit 426.

Figure 6:
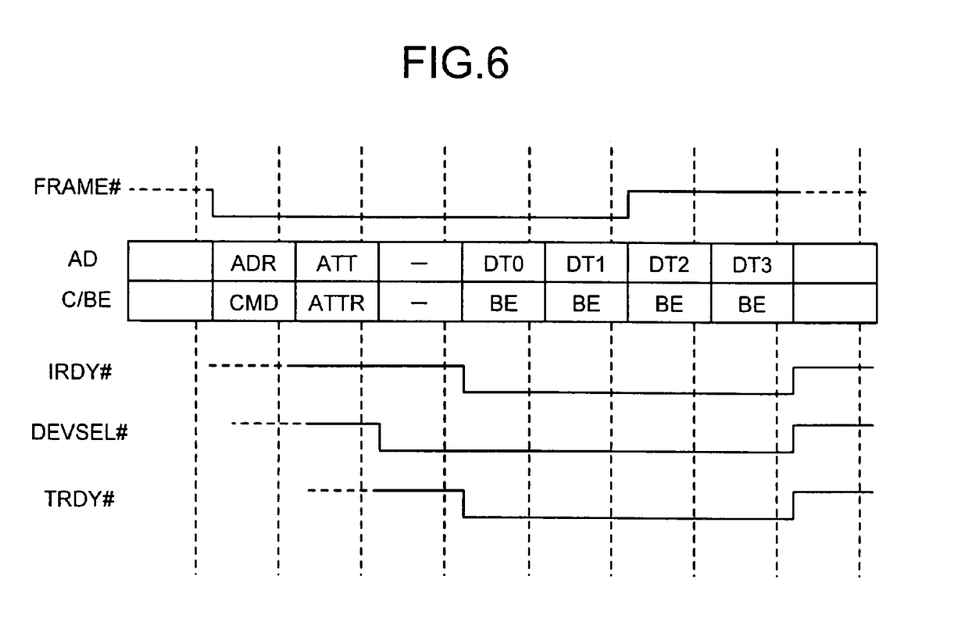
FIG. 6 is a schematic of an example of a bus sequence according to the embodiment.

A method, which is used by the transfer-monitoring unit 425 to retrieve data from the bus 47, will be explained with reference to FIG. 6. FIG. 6 is a schematic of an example of a bus sequence in the bus 47. As shown in FIG. 6, signals of various signal names other than the signal name AD mentioned above are output in the bus 47. In other words, "FRAME #" is output from the time when a burst transfer starts. "command/byte enable (C/BE)" is a signal including a command and a byte enable. "IRDY #" is output from the time when a preparation of data transfer from the bus controller 422 is completed. "DEVSEL #" is output from the time when the cache controller 60 as the data transfer destination starts responding. "TRDY #" is output from the time when a preparation to receive data is completed in the cache controller 60 as the data transfer destination.

Upon detecting that a "FRAME #" signal is output, the transfer-monitoring unit 425 recognizes that the data transfer is in the address phase of "AD" and retrieves the address included in the signal. The retrieved address is a head address of the data to be transferred. If the data transfer by the bus controller 422 is executed normally, the retrieved address matches with the start address in the expected value table 424 at the time when the attribute phase is completed.

The transfer-monitoring unit 425 continues to retrieve the tag data in the attribute phase. The transfer-monitoring unit 425 confirms the transfer start bit included in the tag data. If the transfer start bit is a value (for example, "1") which indicates the data is at the head portion of the transfer data, the transfer-monitoring unit 425 notifies the table updating unit 426 that a transfer of new data is started. Regardless of the transfer start bit, the transfer-monitoring unit 425 notifies the retrieved address and the tag data to the determining unit 427.

When the signals "IRDY #" and "TRDY #" are being output, the transfer-monitoring unit 425 recognizes that the data transfer is in the data phases of "AD" and measures the data length of the data included in the signals. Then, the transfer-monitoring unit 425 notifies the retrieved data length and the tag data to the table updating unit 426.

Returning to FIG. 3, upon receiving a notification from the transfer-monitoring unit 425 that the transfer of new data is started, the table updating unit 426 notifies the expected value table 424 of the DMA circuit 421 that has started the transfer of the new data. Further, upon receiving a notification of the data length and the tag data, the table updating unit 426 updates the start address and the data length which are stored in the expected value table 424 correspondingly to the DMA circuit 421 specified from the tag data. In other words, the table updating unit 426 adds (increments) the notified data length to the start address stored in the expected value table 424 and subtracts (decrements) the notified data length from the data length stored in the expected value table 424.

Upon receiving the notification of the address and the tag data, the determining unit 427 reads the start address which is stored in the expected value table 424 correspondingly to the DMA circuit 421 specified from the tag data, and determines whether the start address matches with the notified address. If the start address differs from the notified address, the determining unit 427 determines that the data transfer by the bus controller 422 is not executed normally and notifies the DMA circuit 421 that the data transfer is not executed normally.

Upon receiving an inquiry about whether the data transfer is completed normally from each DMA circuit 421, the determining unit 427 determines whether the start address which is stored in the expected value table 424 correspondingly to the DMA circuit 421 matches with the end address and whether the data length has become zero. If the start address and the end address do not match in the expected value table 424 or if the data length has not become zero, the determining unit 427 determines that the data transfer by the bus controller 422 is not executed normally and notifies the DMA circuit 421 that the data transfer is not executed normally.

Figure 7:
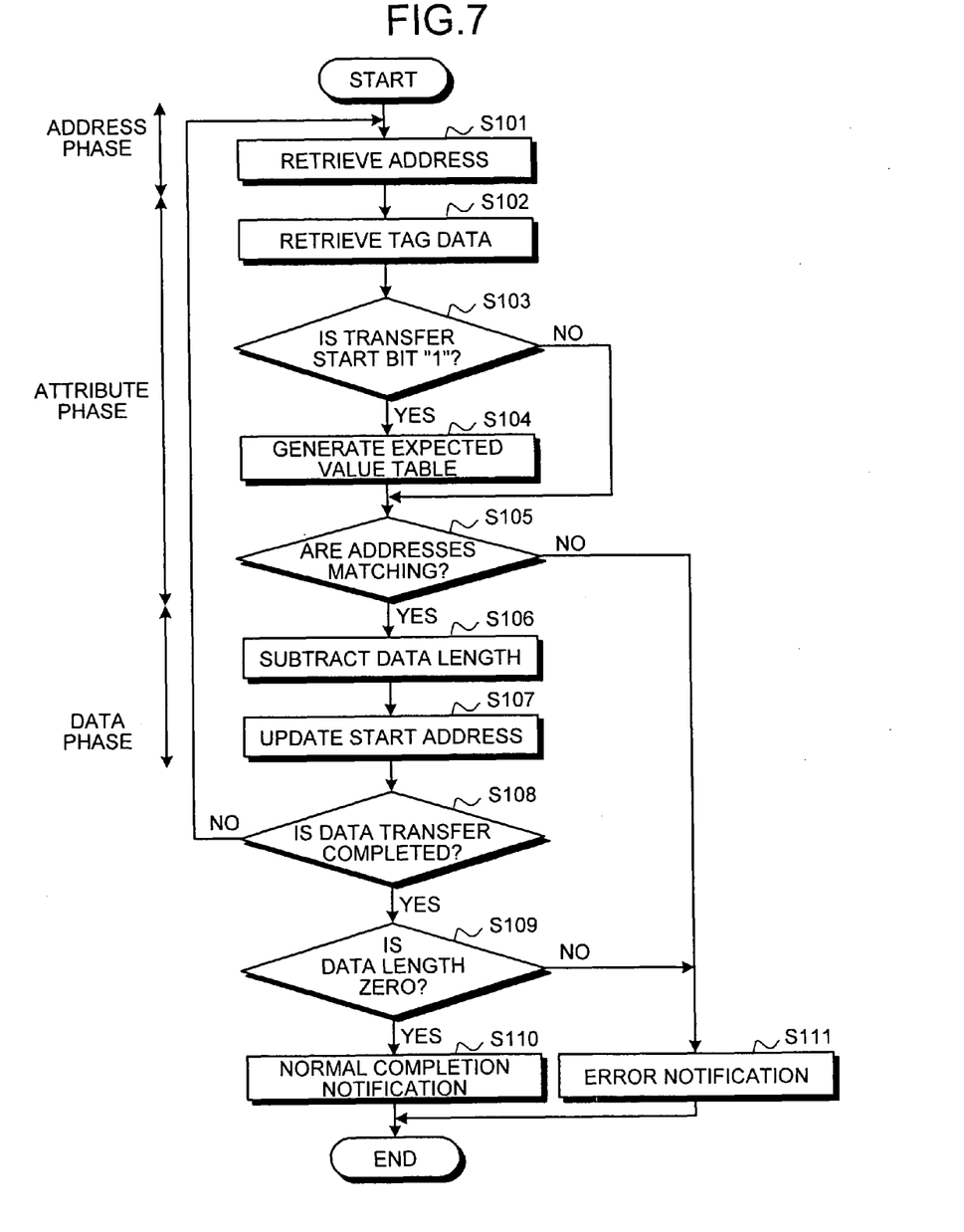
FIG. 7 is a flowchart of an operation of a logic analyzer according to the embodiment.

A monitoring operation of the data transfer in the LSI 42 having the structure mentioned above will be explained next with reference to a flowchart shown in FIG. 7.

Upon transmitting to the LSI 421, the descriptor as an indication of the data transfer from the CPU 43, the transfer-indication storage unit 423 retrieves the descriptor and indicates to the DMA circuits 421, the address and the data length of the transfer data according to the descriptor. Among the DMA circuits 421, the transfer-indication storage unit 423 makes a DMA circuit 421 which is not executing a processing to carry out the data transfer. The DMA circuit 421, which receives the indication, reads the indicated data from the data buffer 41. Within the time interval which is allotted to the bus 47 by the bus controller 422, the DMA circuit 421 adds to the data, the tag data including data which uniquely identifies the DMA circuit 421 and the transfer start bit, and transfers the resulting data to the cache controller 60. Because the data to be transferred is a head portion of the data which is indicated to be transferred by the transfer-indication storage unit 423, the DMA circuit 421 treats the transfer start bit as "1" which indicates the head portion of the data.

While the data is transferred from the bus controller 422 to the cache controller 60 via the bus 47, the transfer-monitoring unit 425 monitors the transfer status in the bus 47. In other words, the transfer-monitoring unit 425 monitors the signal line in the bus 47. Upon detecting the output of the signal "FRAME #" shown in FIG. 6, the transfer-monitoring unit 425 recognizes that the data transfer is in the address phase and retrieves the address from the signal "AD" (step S101). The retrieved address is the start address of the data to be transferred.

Because the address phase is immediately followed by the attribute phase, the transfer-monitoring unit 425 continues to retrieve the tag data mentioned above from the "AD" signal (step S102). In other words, the transfer-monitoring unit 425 retrieves the identification data of the DMA circuit 421 which uses the bus 47 to transfer data, and the transfer start bit. Then, the transfer-monitoring unit 425 refers to the transfer start bit of the tag data and determines whether the data to be transferred is the data of the head portion. In other words, the transfer-monitoring unit 425 determines whether the transfer start bit is "1" which indicates the head portion of data (step S103).

The transfer start bit being "1" ("Yes" at step S103) indicates that the data to be transferred in the burst transfer is the head portion of the data to be newly transferred. Therefore, the address and the data length of the data need to be stored in the expected value table 424. The transfer-monitoring unit 425 notifies the expected value table 424 via the table updating unit 426 that the transfer of new data has started. The address and the data length, which are stored in the transfer-indication storage unit 423, are read by the expected value table 424 and the expected value table 424 that stores therein the expected values of the start address, the end address, and the data length of the data which is newly transferred by the DMA circuit 421 (step S104). To be specific, for example, the bus 47 is allotted to "DMA #1" shown in FIG. 5. When starting the transfer of new data, the address and the data length indicated with respect to the "DMA #1" are read from the transfer-indication storage unit 423, and the start address, the end address, and the data length corresponding to the "DMA #1" are updated.

When the transfer start bit is not "1" ("No" at step S103) or after the new expected value table 424 is generated, the address which is already retrieved by the transfer-monitoring unit 425 during the address phase is notified to the determining unit 427 along with the identification data of the DMA circuit 421. The determining unit 427 determines whether the notified address matches with the start address stored in the expected value table 424 (step S105).

If the transfer start bit is "1" and the expected value table 424 is newly generated, the address in the address phase is expected to match with the start address stored in the attribute phase. Even if the transfer start bit is not "1" and an address other than the head portion of data is retrieved in the address phase, because the start address in the expected value table 424 is continuously updated as explained later, the address in the address phase is expected to match with the start address stored in the expected value table 424.

If the address retrieved in the address phase does not match with the start address stored in the expected value table 424 ("No" at step S105), the determining unit 427 determines that a data transfer error has occurred in the LSI 42 and issues an error notification to the DMA circuit 421 that is carrying out the data transfer (step S111).

If the address retrieved in the address phase matches with the start address stored in the expected value table 424 ("Yes" at step S105), the transfer-monitoring unit 425 detects the start of the data phases from the signals "IRDY #" and "TRDY #", and measures the data length of the data in the bus 47. The transfer-monitoring unit 425 continues to measure the data length until the output of the signals "IRDY #", "DEVSEL #", and "TRDY #" stops and the data phases in the burst transfer are completed. Thus, the transfer-monitoring unit 425 obtains the data length of the pieces of data transferred in the burst transfer.

The transfer-monitoring unit 425 notifies the table updating unit 426 of the measured data length along with the identification data of the DMA circuit 421. The table updating unit 426 subtracts (decrements) the notified data length from the data length stored in the expected value table 424 (step S106), and adds (increments) the notified data length to the start address in the expected value table 424 to update the expected value table 424 (step S107). Thus, the start address in the expected value table 424 is updated to the address which restarts the transfer next time when the bus 47 is allotted to the same DMA circuit 421. Further, the data length in the expected value table 424 indicates the data length of the data which has not been transferred yet, from the data subject to the transfer.

In the present embodiment, the start address and the data length in the expected value table 424 are updated based on the data length which is actually transferred in the bus 47. Therefore, when the transfer of the entire data is completed, the start address and the end address match with each other in the expected value table 424 and the data length becomes zero. Accordingly, when completing the data transfer, the DMA circuits 421 check the start address, the end address, and the data length in the expected value table 424, thus enabling to determine whether the data transfer in the LSI 42 is completed normally. In other words, whether a failure has occurred in the DMA chip (LSI 42) during data transfer can be monitored, so that if a failure has occurred at a place in the DMA chip (LSI 42), the place can be easily specified.

Thus, upon completion of the first burst transfer using the bus 47, the DMA circuits 421 determine whether the transfer of the entire data, which is indicated to be transferred by the transfer-indication storage unit 423, is completed (step S108). If the transfer of the entire data is not completed ("No" at step S108), the DMA circuits 421 again start transferring the data by adding the tag data within the timing when the bus 47 is allotted by the bus controller 422. Although the transfer start bit of the tag data is not "1", because the start address and the data length in the expected value table 424 are updated according to the already transferred pieces of data, the address retrieved in the address phase is expected to match with the start address in the expected value table 424 if the transfer of the pieces of data is executed normally.

If the transfer of the entire data is finished ("Yes" at step S108), the DMA circuits 421 inquire of the determining unit 427 whether the data transfer is completed normally. Then, the determining unit 427 determines whether the data length in the expected value table 424 has become zero (step S109). If the data transfer in the LSI 42 is executed normally, because the data length in the expected value table 424 is expected to be zero, the determining unit 427 determines that a failure has occurred in the data transfer in the LSI 42 and issues an error notification to the DMA circuits 421 that have completed the data transfer (step S111) if the data length has not become zero ("No" at step S109).

On the other hand, if the data length in the expected value table 424 has become zero ("Yes" at step S109) and the start address matches with the end address, the determining unit 427 determines that the data transfer in the LSI 42 is completed normally and issues a notification of normal completion to the DMA circuits 421 that have completed the data transfer (step S110).

In the present embodiment, the expected values of the start address, the end address, and the data length of the transfer data are retrieved from a transfer indication at the time of starting the data transfer, and the expected values of the start address and the data length are updated from the data length of the transferred pieces of data whenever the data is actually split into the pieces of data and transferred. Therefore, when the transfer of the entire data is finished, confirming whether the start address matches with the end address and whether the expected value of the data length has become zero enables to confirm that the data transfer in the DMA chip is executed normally and enables to monitor whether a failure has occurred in the DMA chip.

An example of transferring data to the cache controller 60 by the DMA circuits 421 is explained in the present embodiment. However, the present invention can be applied to any other modifications, similarly to the embodiment mentioned above if the DMA circuits 421 similarly transmit data by using a bus. Further, other processor such as micro processing unit (MPU) may also be provided inside the channel adaptor 40 and the cache controller 60 instead of the CPU.

In the present embodiment, the LSI 42 as the DMA chip is provided with the logic analyzer that monitors the data transfer in the bus 47. However, the present invention may not necessarily be realized by using the logic analyzer. In other words, for example, a monitoring device, which monitors the data transfer in a semiconductor IC such as the DMA chip, can be arranged outside the semiconductor IC.

According to the present invention, the transferring circuit, which receives an indication of a data transfer from the processor and the like, can confirm that the data is transmitted according to the indication. When the DMA chip, which transmits data via the direct memory access, splits the data, whether a failure has occurred in the DMA chip can be monitored.

According to the present invention, the data transfer can be monitored based on both the address and the data length, and whether the data transfer is completed normally can be reliably determined.

According to the present invention, the data length which is already transferred is accurately reflected in the start address, and the stored start address can be used to confirm the authenticity of the data transfer.

According to the present invention, even if the entire data is split and transferred, the address can be used to finally confirm that the entire data is transferred appropriately.

According to the present invention, the already transferred data length is accurately reflected in the stored data length, and the stored data length can be used to confirm the authenticity of the data transfer.

According to the present invention, even if the entire data is split and transferred, the data length can be used to finally confirm that the entire data is transferred appropriately.

According to the present invention, even if the entire data, which is indicated to be transferred, is split into the pieces of data and transferred instead of bulk transfer, the stored address and the data length can be accurately updated.

According to the present invention, when the entire data is split into the pieces of data and transferred, the pieces of data can be transferred while confirming the continuation of all the pieces of data without destruction of the pieces of data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A monitoring device which monitors a data transfer, the monitoring device comprising:
   a monitoring unit that monitors a bus in which a signal including data and address information of the data, and a control signal being output while the data is transferred by using the signal, are output, to retrieve, from the signal being output in the bus, identification information of a transferring circuit having transmitted data, and that measures a data length of the data included in the signal being output in the bus during the control signal being output in the bus, the bus alternately allotted to a plurality of transferring circuits each executing the data transfer according to a transfer indication;
   a storage unit that retrieves expected values of an address and a data length of transfer target data from the transfer indication corresponding to the identification information retrieved by the monitoring unit, and stores therein the expected values with the identification information;

an updating unit that updates, based on the data length measured by the monitoring unit, the expected values of the address and the data length stored in the storage unit; and a determining unit that determines, at a time of completion of a transfer of the transfer target data by the transferring circuit, whether the data transfer is completed normally based on one of the expected values of the address and the data length which are stored in the storage unit, wherein the monitoring unit measures each of data lengths of pieces of data obtained by splitting the transfer target data, the splitting includes adding tag data that identifies a direct memory access circuit and includes a transfer start bit that indicates whether the data is at the head portion of the transfer;

the storage unit stores therein the expected values of addresses and the data lengths of the pieces of data, the updating unit updates the expected values of the addresses and the data lengths, and the determining unit determines, at a time of completion of a transfer of each of the pieces of data or completion of a transfer of the transfer target data split into the pieces of data, whether the data transfer is completed normally.

2. The monitoring device according to claim 1, wherein the storage unit stores therein the expected values of a start address, an end address, and the data length of the transfer target data.

3. The monitoring device according to claim 2, wherein the updating unit adds the data length measured by the monitoring unit to the expected value of the start address stored by the storage unit.

4. The monitoring device according to claim 3, wherein the determining unit determines, at the time of completion of the transfer of the transfer target data by the transferring circuit, that the data transfer is completed normally when the expected value of the start address stored in the storage unit matches with the end address.

5. The monitoring device according to claim 1, wherein the updating unit subtracts the data length measured by the monitoring unit from the expected value of the data length stored by the storage unit.

6. The monitoring device according to claim 5, wherein the determining unit determines, at the time of completion of the transfer of the transfer target data by the transferring circuit, that the data transfer is completed normally when the expected value of the data length stored in the storage unit is zero.

7. The monitoring device according to claim 1, wherein the monitoring unit measures a data length of each piece of data, among the transfer target data, which is transferred during a time interval when the bus is allotted to the transferring circuit.

8. The monitoring device according to claim 7, wherein the determining unit determines, at a time of starting the transfer of pieces of data by the transferring circuit, whether address information which is related to and added to the pieces of data matches with the expected value of the address stored in the storage unit.

9. A semiconductor integrated circuit comprising:

a plurality of transferring circuits that are alternately allotted a bus in which a signal including data and address information of the data, and a control signal being output while the data is transferred by using the signal, are output, to execute a data transfer via a direct memory access according to a transfer indication from a processor;

a monitoring unit that monitors the bus to retrieve, from the signal being output in the bus, identification information of a transferring circuit having transmitted data, and that measures a data length of the data included in the signal being output in the bus during the control signal being output in the bus;

a storage unit that retrieves expected values of an address and a data length of transfer target data from the transfer indication corresponding to the identification information retrieved by the monitoring unit, and stores therein the expected values with the identification information;

an updating unit that updates, based on the data length measured by the monitoring unit, the expected values of the address and the data length stored in the storage unit; and a determining unit that determines, at a time of completion of a transfer of the transfer target data by the transferring circuit, whether the data transfer is completed normally based on one of the expected values of the address and the data length which are stored in the storage unit, wherein the monitoring unit measures each of data lengths of pieces of data obtained by splitting the transfer target data, the splitting includes adding tag data that identifies a direct memory access circuit and includes a transfer start bit that indicates whether the data is at the head portion of the transfer;

the storage unit stores therein the expected values of addresses and the data lengths of the pieces of data, the updating unit updates the expected values of the addresses and the data lengths, and the determining unit determines, at a time of completion of a transfer of each of the pieces of data or completion of a transfer of the transfer target data split into the pieces of data, whether the data transfer is completed normally.

10. A monitoring method of a data transfer, the monitoring method comprising:

monitoring, with a monitoring device, a bus in which a signal including data and address information of the data, and a control signal being output while the data is transferred by using the signal, are output, to retrieve, from the signal being output in the bus, identification information of a transferring circuit having transmitted data, the bus alternately allotted to a plurality of transferring circuits each executing the data transfer according to a transfer indication;

measuring a data length of the data included in the signal being output in the bus during the control signal being output in the bus;

retrieving expected values of an address and a data length of transfer target data from the transfer indication corresponding to the identification information retrieved;

storing the expected values with the identification information in a storing circuit;

updating the expected values of the address and the data length stored in the storing circuit based on the data length measured in the measuring; and determining whether the data transfer is completed normally based on one of the expected values of the address and the data length which are stored in the storing circuit at a time of completion of a transfer of the transfer target data by the transferring circuit, wherein the measuring includes measuring each of data lengths of pieces of data obtained by splitting the transfer target data, the splitting includes adding tag data that identifies a direct memory access circuit and includes a transfer start bit that indicates whether data is at the head portion of the transfer;

the retrieving includes retrieving the expected values of addresses and the data lengths of the pieces of data, the updating includes updating the expected values of the addresses and the data lengths, and the determining includes determining, at a time of completion of a transfer of each of the pieces of data or completion of a transfer of the transfer target data split into the pieces of data, whether the data transfer is completed normally.

11. The monitoring device according to claim 1, wherein the monitoring unit retrieves the identification information of the transferring circuit according to a transfer indication, from the signal being output in the bus in an attribute phase preceding a data phase during which the control signal is output.

* * * * *